United States Patent
O'Hara

(10) Patent No.: US 12,169,006 B2
(45) Date of Patent: Dec. 17, 2024

(54) RADIAL PISTON MACHINE WITH BRAKE

(71) Applicant: Robert Bosch GmbH, Stuttgart (DE)

(72) Inventor: Frank O'Hara, Fife (GB)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 17/533,448

(22) Filed: Nov. 23, 2021

(65) Prior Publication Data
US 2022/0170460 A1  Jun. 2, 2022

(30) Foreign Application Priority Data
Nov. 30, 2020 (EP) .................................... 20210554

(51) Int. Cl.
| | |
|---|---|
| *F04C 15/00* | (2006.01) |
| *F04C 9/00* | (2006.01) |
| *F16D 55/36* | (2006.01) |
| *F16D 55/40* | (2006.01) |
| *F16D 59/02* | (2006.01) |

(52) U.S. Cl.
CPC .............. *F16D 55/36* (2013.01); *F04C 9/002* (2013.01); *F04C 15/0084* (2013.01); *F16D 55/40* (2013.01); *F16D 59/02* (2013.01)

(58) Field of Classification Search
CPC .............................. F16D 55/36; F16D 2121/06
See application file for complete search history.

(56) References Cited

U.S. PATENT DOCUMENTS

| | | | | |
|---|---|---|---|---|
| 5,439,356 A | * | 8/1995 | Grahl | F03C 1/0444 |
| | | | | 91/485 |
| 2019/0128259 A1 | * | 5/2019 | Gerlach | F03C 1/0431 |

FOREIGN PATENT DOCUMENTS

| | | | | |
|---|---|---|---|---|
| DE | 4011021 A1 | * | 10/1990 | |
| DE | 44 07 563 C2 | | 8/2003 | |
| GB | 2239907 A | * | 7/1991 | ............ F03C 1/0447 |
| GB | 2252799 A | * | 8/1992 | ............ F03C 1/0447 |
| GB | 2284450 A | * | 6/1995 | ............ F03C 1/0447 |

* cited by examiner

*Primary Examiner* — Melody M Burch
(74) *Attorney, Agent, or Firm* — Maginot, Moore & Beck LLP

(57) ABSTRACT

A radial piston machine includes a rotor within a housing that is rotatable about an axis, a shaft coupled to the rotor, a distributor which surrounds the shaft and cannot rotate with the rotor and that contacts the rotor in an axial direction, a plurality of brake discs including first brake discs and second brake discs arranged side-by-side along the axis, wherein the first brake discs are coupled to the housing for torque transmission, and the second brake discs are coupled to the shaft for torque transmission, and an actuator configured to releasably exert a brake force in the axial direction on the brake discs. The distributor is located axially between the rotor and the actuator, and the brake discs are located axially between the distributor and the actuator. When the brake force is exerted the brake force is supported by the distributor in the axial direction.

9 Claims, 2 Drawing Sheets

RADIAL PISTON MACHINE WITH BRAKE

This application claims the benefit of priority to Serial No. EP 20210554.0, filed on Nov. 30, 2020, the disclosure of which is incorporated herein by reference in its entirety.

The present disclosure relates to a radial piston machine.

BACKGROUND

A radial piston machine is known in the art as being a type of rotating hydrostatic machine that is capable of belong operated as either a pump or a motor. The radial piston machine has a rotor in communication with fluid, said communication being effected via a distributor as a non-rotating part, an end face of the distributor being in contact with an end-face of the rotor. It is also known in the art to provide a brake, wherein a brake force can be applied so as to frictionally restrict rotation of the rotor. Such a machine incorporating a brake is known from DE 4407563 C2.

However it is considered that improvements in aspects such as performance, ease of manufacture and simplicity of design can be achieved.

SUMMARY

It is an object of the disclosure to provide a configuration that can achieve improvements in the above-mentioned aspects.

The disclosure is defined by the subject-matter described herein. Advantageous developments are laid out in the disclosure.

The disclosure provides a radial piston machine comprising: a housing, a rotor within the housing, wherein the rotor is rotatable about an axis, a shaft coupled to the rotor for torque transmission, a distributor which surrounds the shaft and cannot rotate with the rotor and that contacts the rotor in an axial direction for communicating fluid to and from the rotor, a plurality of brake discs comprising first brake discs and second brake discs arranged side-by-side along the axis, wherein the first brake discs are coupled to the housing for torque transmission, and the second brake discs are coupled to the shaft for torque transmission, and an actuator configured to releasably exert a brake force in the axial direction on the brake discs, wherein the distributor is located axially between the rotor and the actuator, and the brake discs are located axially between the distributor and the actuator; when the brake force is exerted the brake force is supported by the distributor in the axial direction.

With the configuration identified in the paragraph above the brake force is supported by the distributor in the direction of the axis. Thus the brake discs can transfer the brake force to the distributor which in turn can transfer the brake force to the rotor; the brake force maintains a contact, such as a surface-to-surface contact, between a face of the distributor and a face of the rotor, even when no other loads urge the distributor towards the rotor. In particular there is no need to provide members such as an additional spring to press directly on the distributor in the direction of the rotor, nor is there a need to provide the housing with a lower diameter portion, such as a bulkhead, for supporting the spring. Access to the interior of the housing is facilitated, especially during its manufacture.

It may be provided that when the brake force is not exerted the distributor is interposed between the rotor on the one hand and the brake discs on the other hand with axial play; and/or that when the brake force is exerted, the distributor is axially urged by the rotor on its one side and by the brake discs on its other side, preferably by only these two. So transfer of the brake force can be more reliably effected.

It may be provided that the distributor does not make direct axial contact with the housing. So the distributor can more reliably transfer the brake force to the rotor.

It may be provided that the housing contains the distributor and the brake discs without interposing these two. So the distributor can more reliably transfer the brake force to the rotor.

It may be provided that when the brake force is exerted the brake discs transfer the entire brake force to the distributor. Preferably the distributor may transfer the entire brake force to the rotor. So the distributor can more reliably press on the rotor when the brake is applied.

It may be provided that when the brake force is exerted one of the brake discs directly contacts the distributor.

With the configuration identified in the paragraph above, one of the first or one of the second brake discs can directly act on the distributor. A more efficient design is facilitated and the transfer of the brake force can be made more reliable. Since the load from the brake discs is not split into a load path which might divert at least a part of the brake force from the distributor to, for example, the housing, it is facilitated that there is no portion of the housing, such as a bulkhead, that is pressed between the distributor and the brake discs. The weight of the housing can be reduced.

It may be provided that one or more members are provided between the brake discs on the one hand and the distributor on the other hand, the one member or all of the members being axially movable relative to the housing (e.g. fitted with axial play), and when the brake force is exerted, one of the brake discs contacts the distributor via the one member or all of members.

With the configuration identified in the paragraph above, even though members such as spacers or springs may be provided between the distributor and the brake discs, the transfer of the brake force from the brake discs to the distributor (and in turn to the rotor) can be ensured because all of said members are neither axially fixed to the housing, nor integral with the housing.

A clearance may be provided to allow axial play between any of: the rotor, the distributor, one or more brake discs, and the actuator, in particular when the brake force is not exerted.

It may be provided that the actuator is hydraulically operable by a fluid having a pressure such that: the brake force is not exerted when the pressure is a first pressure, and the brake force is exerted when the pressure is a second pressure lower than the first pressure, or when no pressure is present.

With the configuration identified in the paragraph above, it is possible to control the brake force hydraulically.

It may be provided that a biasing means, preferably a biasing member (e.g. spring), further preferably a disc spring, urges the actuator toward the brake discs. In other words the actuator and the biasing means may form a piston-spring arrangement. The spring, which is preferably preloaded, may urge on the actuator as the piston in a first direction such as a brake actuation direction.

The actuator may be axially moveable relative to the housing.

Fluid pressure may be transmissible to a side of the actuator to yield a force on the actuator in a second direction opposite to the first, such as in a direction of brake release.

It may be provided that the pressure acts directly on the distributor to yield a force which is directed along the axis to the rotor.

With the configuration identified in the paragraph above, the fluid contacts the distributor, and may also contact the brake discs. Because of any force arising from the pressure transmission, contact between the rotor and the distributor can be further ensured. Also since the distributor is not isolated from the fluid, there are fewer sealing surfaces (fewer runout tolerances) to control; the manufacture of a member such as the housing is easier.

It may be provided that at least the distributor is isolated (such as by means of a seal) from any fluid that operates the actuator.

With the configuration identified in the paragraph above, a first pressure as a first actuator pressure does not contact the distributor. Since the axial load on the distributor is essentially due only to the brake force and a force resulting from any drive pressure being the pressure that drives the rotation of the rotor, the movement of the distributor and/or the brake discs can be more reliably controlled.

A seal may be provided in a (radial) clearance bounded by the housing and the actuator, so that the distributor is isolated from any fluid that operates the actuator.

The seal may be provided to one axial side of the brake discs, the side facing the actuator.

The seal may be provided between a circumferential surface of the actuator and a circumferential surface of the housing.

The seal may comprise, or be formed as, a sealing member such as an O-ring and/or a lip seal.

It may be provided that a first abutment being an abutment between the rotor and the distributor creates a sealing effect between these.

With the configuration identified in the paragraph above, a seal effect is achieved while allowing relative rotation. Since the distributor can axially urge (e.g. bear on) the rotor because the brake discs transfer the brake force to the distributor, and/or because fluid pressure acts on to the distributor. The sealing effect at the first abutment can be improved.

The first abutment may be a direct contact between the rotor and the distributor, such as a surface-to-surface contact, further preferably a metal-to-metal contact.

It may be provided that the shaft is axially supported by a bearing, the shaft is coupled to the rotor to allow axial movement therebetween, and a second abutment being an abutment between the rotor and the bearing creates a sealing effect between these.

With the configuration identified in the paragraph above, the sealing effect at the second abutment can be improved.

The second abutment may be a direct contact between the rotor and the bearing, such as a surface-to-surface contact, further preferably a metal-to-metal contact.

The contact may be made on faces which are planar and/or perpendicular to the axis. So a sealing effect is achieved between these. The bearing may axially support the distributor via at least the rotor. The rotor and the bearing may be axially relatively moveable.

It may be provided that the housing includes a one-piece housing that houses at least the distributor and the brake discs.

With the configuration identified in the paragraph above, the housing can have a simpler transition from its portion surrounding the distributor to its portion surrounding the brake discs. The manufacture of the housing, in particular any broaching of its interior, is facilitated.

It may be provided that a region of the inner periphery of the housing is provided with splines, and preferably all regions of the housing not including the splined region are provided radially further from the axis than the roots of the splines.

With the configuration identified in the paragraph above, the manufacture is further facilitated since any broaching tool is not obstructed by regions of the housing that are radially closer to the axis than the internal splines, such as radially closer to the axis than the major diameter of the splines. So the distributor and brake discs can be more easily provided in a one-piece housing member.

It may be provided that the distributor has at least one gallery such as an annular channel provided on its outer periphery to communicate fluid between the rotor and a port on the housing. A first and a second gallery may be provided. The gallery may communicate with one or more axially extending passages in the distributor.

A gallery may be sealed by at least one gallery seal as a seal that may comprise, or be formed as, an O-ring and/or a backing ring The seal may fill a clearance bounded by the distributor and the housing. In this way the gallery seal maintains its sealing function while allowing axial movement between the distributor and the housing.

BRIEF DESCRIPTION OF THE DRAWINGS

Embodiments are described in the following with the help of the appended figures, wherein.

DETAILED DESCRIPTION

Figure 1:
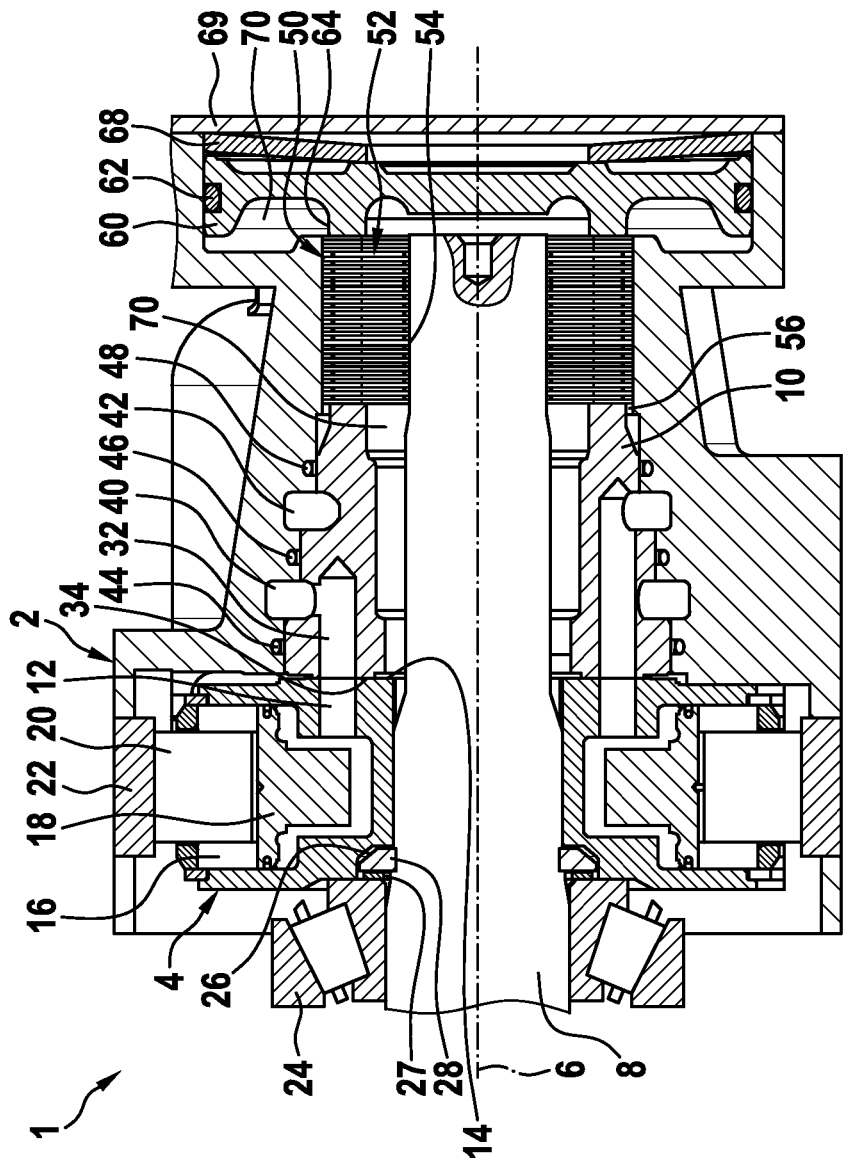
FIG. 1 shows a radial piston machine according to an embodiment.

FIG. 1 shows a longitudinal cross-sectional view of a radial piston machine (hereinafter called "machine 1") incorporating a brake. When used to drive a vehicle the brake may serve as a parking brake. The machine has a housing (as a stator) in which a rotor 4 is provided. A shaft 8 is coupled to the rotor 4 so that torque can be transmitted between these. For example the rotor 4 is slidably fitted on the shaft 8 in a torque transferable way such as by means of a keyway or splines. The shaft 8 may comprise or be formed as several shafts. The rotor 4 is in contact with a distributor 10 described in more detail later. The shaft 8 is rotationally supported by and axially fixed to the housing 2.

The rotor 4 can rotate about an axis 6. The rotor 4 has an annular-shaped cylinder block with an axial hole through its centre through which the shaft 8 passes. The rotor 4 has a plurality of radially extending cylindrical bores 16 (hereinafter called "bores 16") arranged in a circumferential pattern, each bore 16 receiving a reciprocating piston 18. The radially outer end of each piston 18 is connected to a cylindrical roller 20. Each piston 18 can reciprocate, urged by pressurized fluid in the cylinder, while its roller 20 bears on cam ring 22. It is known that by coordinating the communication of fluid to and from the bores 16 with the angular position of the rotor 4, the rotor 4 can be made to turn.

The rotor 4 abuts on one of its axial sides against a bearing 24 that is axially supported on the shaft 8. The bearing 24 may be configured to support a thrust load. Alternatively or in addition the rotor 4 may abut on a stepped portion on the shaft 8, or on a locating member, such as a circlip, that is axially fixed to the shaft 8.

A recess 26 is provided at a radial inner end of the rotor 4 to allow room for a spacer 27 and locating ring 28 to be fixed to the shaft 8, for limiting the axial movement of the bearing 24.

Axially extending fluid passages (hereinafter called "rotor passages 12") are arranged in a circumferential pattern about the axis 6, near a radially inner-end side of the rotor 4 with respect to the bores 16, said passages 12 opening at a face (hereinafter "rotor face 14") of the rotor 4, which is can be called timing face or communication face. Each rotor passage 12 is fluidly coupled to a respective bore 16. The rotor face 14 comprises a planar surface which is perpendicular to the axis 6.

The distributor 10 is a cylindrical part that surrounds the shaft 8 and cannot rotate with the shaft 8. The outer periphery of the distributor 10 is configured to fit closely to the inner periphery of the housing with a clearance. The distributor 10 is axially slidably coupled to the housing so that torque can be transmitted between these. For example the distributor 10 may be rotationally fixed to the housing.

Axially extending fluid passages (hereinafter called "distributor passages 32") are arranged in the distributor 10 in a circumferential pattern about the axis 6, said passages 32 opening at a face (hereinafter "distributor face 34") of the distributor 10, said distributor face 34 facing the rotor 4. The distributor face 34, which can be called timing face or communication face, comprises a planar surface which is perpendicular to the axis 6. The pitch diameter of the distributor passages 32 is substantially equal to the pitch diameter of the rotor passages 12.

Two annular grooves as respective first and second galleries 40, 42 are formed in the outer periphery of the distributor 10. The first gallery 40 is in communication with some of the distributor passages 32. The second gallery 42 is in communication with the other distributor passages 32. Seals 44, 46, 48 each provided in a respective groove occupy a gap between the outer periphery of the distributor 10 and an inner periphery of the housing. So the galleries 40, 42 can be isolated from each other and from their outsides. The galleries 40, 42 are fluidly connected to respective high and low pressure ports (not shown) provided in the housing, which are known as drive ports. Each seal 44, 46, 48 comprises an O-ring and a backing ring. Each seal 44, 46, 48 can be called a gallery seal.

The outer periphery of the distributor 10 is provided with a series of surfaces having different diameters in a step-wise fashion. By sizing the galleries 40, 42 in a way known in the art, a force on the distributor 10 is achieved when the galleries 40, 42 are filled with pressurized fluid for driving the rotor, to yield a compensating force (hereinafter called "gallery thrust") on the distributor 10 along the axis 6 and directed towards the rotor 4. The distributor 10 can be pressed to the rotor 4 by the gallery thrust.

The distributor 10 (in particular the distributor face 34) can directly or indirectly contact the rotor 4 (in particular the rotor face 14) to axially urge it. Thus fluid can communicate between the rotor 4 and distributor 10. By urging the distributor 10 toward the rotor 4, a sealing effect between these is achieved. The mating parts may make surface-to-surface contact, optionally metal-to-metal contact.

As a braking means, a friction brake is connected between the rotor 4 and the housing 2. The brake comprises a brake pack including a plurality of first and second brake discs 50, 52 as disc- or plate-shaped rings arranged side-by-side along the axis 6, each surrounding the shaft 8. The brake pack is provided adjacent to the distributor 10 at the axial end of the distributor 10 facing away from the rotor 4. Some, preferably all, of the first and second brake discs 50, 52 are arranged alternatingly in the axial direction. The housing 2 is provided with splines 56 at a portion such as a lowest-diameter portion of the housing's inner periphery. The shaft 8 is provided with splines 54 on its outer periphery at least in a region of the shaft 8 that axially coincides with the splines 56 of the housing. Each first brake disc 50 is provided on its outer periphery with splines which slidingly engage with the splines 56 of the housing to allow torque transfer between these. Each second brake disc 52 is provided on its inner periphery with splines which slidingly engage with the splines 54 of the shaft 8 to allow torque transfer between these. The first and second discs 50, 52 are allowed to come into contact, and to move apart from each other, in the axial direction.

The machine 1 is provided with an actuator 60 for releasably compressing the brake discs 50, 52 together. The actuator 60 is formed as a disc or plate-like member and faces the brake discs. The actuator 60 fits in an inner periphery of the housing 2 with a clearance to allow axial sliding therebetween. A seal 62 is provided in the clearance, which may comprise, or be formed as, an O-ring provided in a groove on the actuator 60. The actuator 60 has an annular protrusion 64 located part way between its inner and outer diameter that extends axially towards the brake discs 50, 52 to directly or indirectly bear on these through surface-to-surface contact. The outer diameter of the protrusion 64 is sized to have a radial clearance with the splines 56. The shaft 8 does not penetrate the actuator 60, and an axial clearance is provided between these.

A biasing means formed as a disc spring 68 is arranged between the actuator 60 and a cover 69, wherein the cover closes an open end of the housing 2 and is fixed to the housing 2. The disc spring 68 is preloaded so that it urges the actuator 60 and the cover 69 apart with a spring force. When the brake is applied the friction generated between opposing pairs of surfaces of the first and second brake discs 50, 52, effects a brake on the rotating parts. At this time the distributor 10 transfers the load from the disc spring 68, via the actuator 60 and the brake discs 50, 52, to the rotor 4. In doing so the brake discs 50, 52 can transfer essentially the entire brake force to the distributor 10; that is to say the brake force does not wholly or partially bypass the distributor 10, for example by being transferred to the housing 2 or a part axially fixed to the housing 2.

So the rotor 4 is provided adjacent to the bearing 24 at the rotor's one axial end, and to the distributor 10 at the rotor's other axial end. The brake discs 50, 52 are provided adjacent to the distributor 10 on their one axial end, and to the actuator 60 on their other axial end. The actuator 60 is provided between the brake discs 50, 52 on the one hand and the disc spring 68 on the other hand.

A pressurizable cavity 70 in the housing 2 is provided, being exposed to at least the shaft 8, bearing 24, rotor 4, distributor 10, actuator 60, and housing 2, and contains the brake discs. When the cavity 70 is full of pressurized fluid having a first actuator pressure (for example via a not-shown third port provided in the housing) the pressure is transmitted to the actuator 60 to yield a first axial force in opposition to the spring force. In this way the compression force ("brake force") on the brake discs can be at least partially released. When the actuator pressure is reduced to a second actuator pressure lower than the first actuator pressure, or to no pressure, the brake force is restored. The fluid for actuating the actuator contacts the distributor 10, so the actuator pressure is transmitted to the distributor 10 to yield a second axial force in the direction of the rotor 4. Said second axial force maintains or improves contact between the rotor face 14 and the distributor face 34. The gallery seals 44, 46, 48 isolate the galleries from the fluid in the cavity 70.

In a typical operation the rotor 4 rotates due to its cylinders communicating with the aforementioned drive ports via the distributor 10. The direction of rotation is determined by the control mode selected. At the same time the cavity 70 is pressurized with fluid at the first actuator pressure so that the actuator 60 is urged away from the brake discs 50, 52, thus releasing the brake. Sealing contact between the distributor 10 and the rotor 4 is achieved by the gallery thrust in addition to the aforementioned second axial force.

When the distributor 10 is urged against the rotor 4, the rotor 4 in turn is urged against the bearing 24, and the sealing effect at the contact faces between these last two is achieved.

In the case of braking, the actuator pressure is reduced to the second actuator pressure, or to no pressure, so that the actuator 60, under the load of the disc spring 68, moves toward the brake discs 50, 52 to compress these. The brake discs 50, 52 act directly on the distributor 10. So the distributor 10 is urged against the rotor 4 by the brake force, even in the case that the gallery thrust is removed or reduced. The contact between the rotor 4 and distributor 10 is reliably maintained. Likewise in the case of machine start-up the contact can be reliably maintained even as the brake is released, regardless of the state of gallery thrust.

Modification of the Embodiment

Figure 2:
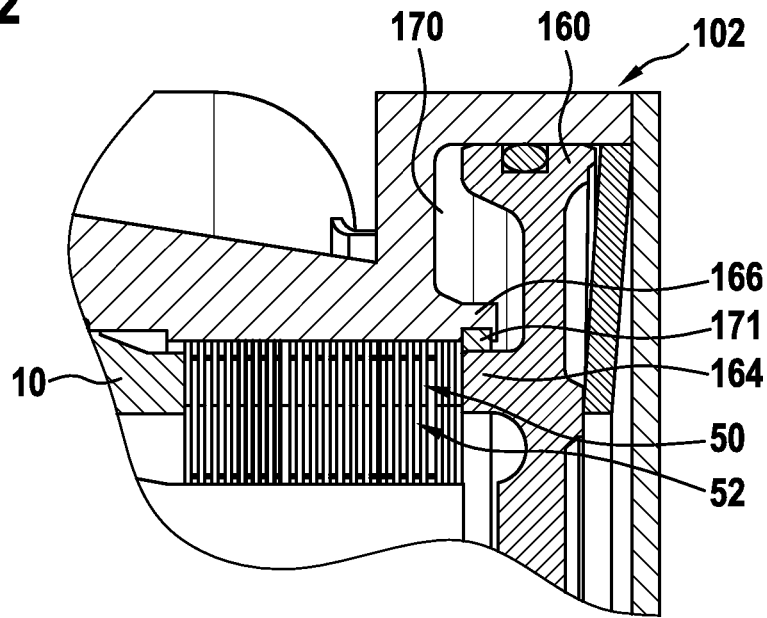
FIG. 2 shows a modification to the embodiment.

A modification to the above-described embodiment is described in the following, wherein differences between these are identified. As shown in FIG. 2 the main difference from the embodiment is the addition of a seal 171 provided between a) the protrusion 164 on the actuator 160, and b) an axially extending and annular internal wall 166 of the housing 102, to seal a radial clearance bounded by these while allowing axial movement between these. The seal 171 is provided to one side of the brake discs 50, 52, which side faces the actuator 160. The seal 171 may comprise, or be formed as, an O-ring and/or lip seal. Thus a cavity 170 is achieved which is exposed to the radially higher portions of the actuator 160 and the housing 102. The seal 171 isolates the cavity 170 from parts such as the rotor 4, shaft 8, distributor 10, and brake discs 50, 52. In this way the pressure in the cavity 170 can be controlled to operate the brake without said pressure being transmitted to at least the distributor 10. The fluid in the cavity 170 can be easily sealed. A suitable surface area on the actuator 160 that is exposed to the actuator pressure in the cavity 170 can be more easily achieved. Nonetheless the distributor 10 can still be urged toward the rotor 4, by providing the aforementioned gallery thrust, and optionally by the brake force.

Figure 3:
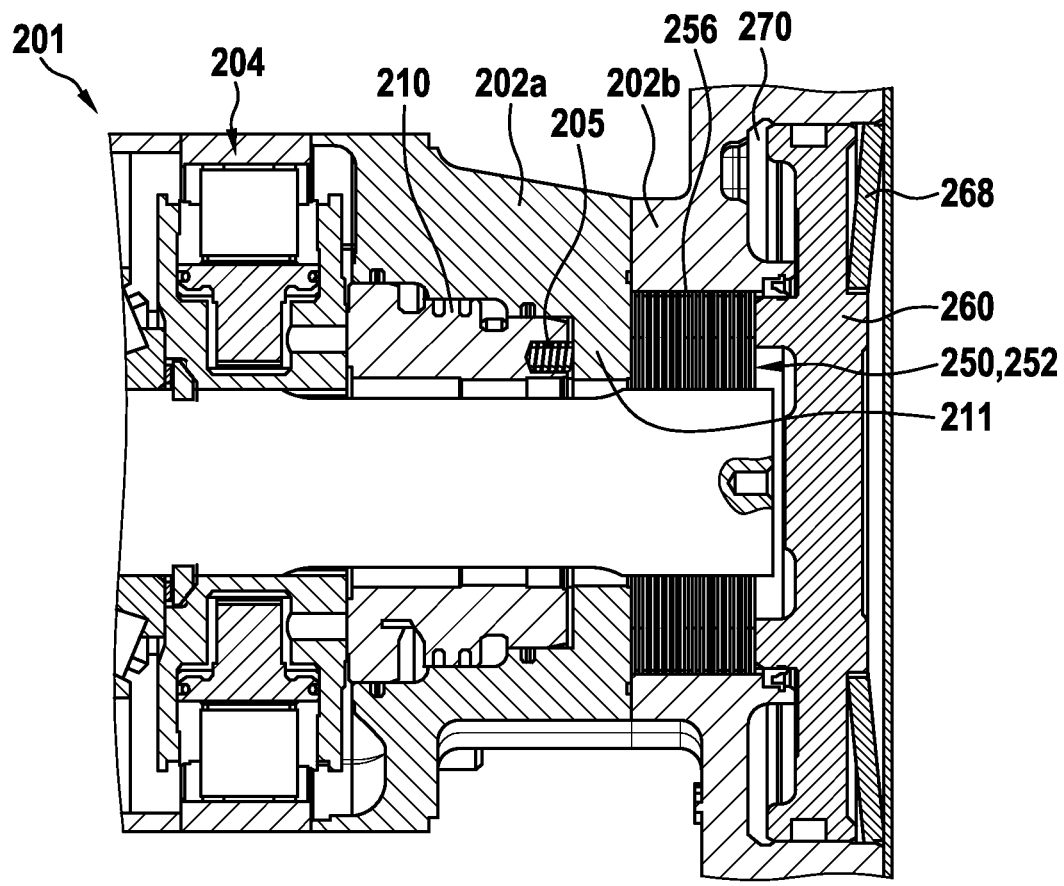
FIG. 3 shows a radial piston machine according to a comparative example.

To illustrate effects and advantages of the embodiment and its modification, a comparative example of a radial piston machine is described in the following. As shown in FIG. 3 the machine 201 of the comparative example has a housing comprising a first housing 202a and a second housing 202b. The first housing 202a surrounds a distributor 210. The first housing 202a has a bulkhead 211 positioned between the brake discs 250, 252 and the distributor 210, and which has an inner diameter which is lower than that of other portions of the first housing 202a. A coil spring 205 is provided between the bulkhead 211 and the distributor 210 to urge the distributor 210 against the rotor 204. A brake force from a disc spring 268 is applied to the brake discs 250, 252 via an actuator 260. By pressurizing the fluid in a cavity 270 bounded by the actuator 260 and the housing 202b, a force opposing the brake force causes a release of the brake. The distributor 210 does not support the brake force. The brake force is supported by the bulkhead 211. And since the splines 256 on the inside of the housing 202b are made by broaching, the housing must be made as separate parts 202a, 202b, wherein the bulkhead 211 must be provided on the first housing 202a so that the broaching operation on the second housing 202b is not obstructed.

But in the embodiment and its modification, since the brake force is supported by the distributor 10 it is possible to maintain contact between the distributor 10 and the rotor 4 even when the galleries 40, 42 are not pressurized (e.g. during periods when the machine does not rotate). Therefore it is not necessary to provide features such as additional springs supported by a housing. A bulkhead provided between the distributor and the brake pack is not required. One may still provide additional members interposed between the actuator and the distributor such as washers or springs, wherein such members are not axially fixed to the housing. It may be provided that the brake discs on the one hand and the distributor on the other hand make a combination of direct and indirect contact with each other, for example by providing a recess on the face of the distributor, said face facing the brake discs, in which recess a member (e.g. spring) is fitted.

So it is facilitated to provide a region of the housing's inner periphery with splines, wherein the other regions of the housing 2, 102 are provided radially further from the axis 6 than the splines 56, such as radially further from the axis 6 than the major circle of the splines 56.

A housing 2, 102 that houses at least the distributor 10 and the brake discs 50, 52 can be formed as a one-piece (integral) housing, in particular wherein the splines 56 are integrally formed on the housing 2, 102, for example by means of broaching.

When the seal 171 is omitted, such as in the unmodified embodiment, the housing 2 and/or the actuator 60 can be manufactured (e.g. machined) with fewer runout (e.g. concentricity) requirements. Manufacturing and inspecting effort can be further reduced when the actuator 60, 160 has no central hole.

REFERENCE SIGNS radial piston machine . . . 1, 201
housing . . . 2, 102, 202a, 202b
rotor . . . 4, 204
axis . . . 6
shaft . . . 8
distributor . . . 10, 210
rotor passages . . . 12
rotor face . . . 14
bore . . . 16
piston . . . 18
roller . . . 20
cam ring . . . 22
bearing . . . 24
recess . . . 26
spacer . . . 27
locating ring . . . 28
distributor passages . . . 32
distributor face . . . 34 first gallery . . . 40
second gallery . . . 42
gallery seal . . . 44, 46, 48
first brake discs (stator) . . . 50, 250
second brake discs (rotor) . . . 52, 252
shaft splines . . . 54
housing splines . . . 56, 256
actuator . . . 60, 160, 260
seal (actuator outer dia.) . . . 62
protrusion (actuator) . . . 64, 164
disc spring . . . 68, 268
cover . . . 69
cavity . . . 70, 170, 270
internal wall . . . 166
seal . . . 171
springs . . . 205
bulkhead . . . 211

The invention claimed is:

1. A radial piston machine, comprising:
a housing;
a rotor within the housing, wherein the rotor is rotatable about an axis;
a shaft coupled to the rotor and configured to transmit torque;
a distributor which surrounds the shaft and cannot rotate with the rotor and that contacts the rotor in an axial direction, the distributor configured to communicate fluid to and from the rotor;
a plurality of brake discs comprising first brake discs and second brake discs arranged side-by-side along the axis, wherein the first brake discs are coupled to the housing and configured to transmit torque, and the second brake discs are coupled to the shaft and configured to transmit torque; and
an actuator configured to releasably exert a brake force in the axial direction on the brake discs,
wherein the distributor is located axially between the rotor and the actuator, and the brake discs are located axially between the distributor and the actuator such that, when the brake force is exerted, the distributor axially supports at least one of the plurality of brake discs such that the brake force acts on the distributor in the axial direction, and
wherein the at least one of the plurality of brake discs is configured such that, when the brake force is exerted, the at least one of the plurality of brake discs directly contacts the distributor,
wherein the actuator is hydraulically operable by a pressure fluid and configured such that the actuator does not exert the brake force on the plurality of brake discs when a pressure of the pressure fluid is greater than a predetermined first pressure and the actuator exerts the brake force when the pressure is less than the first pressure, and
wherein the housing defines a cavity in which the pressure fluid acts on the actuator, and a seal is arranged at an axial end of the plurality of brake discs opposite the distributor so as to isolate at least an end surface of the distributor from the pressure fluid in the cavity.

2. The radial piston machine according to claim 1, wherein a first abutment between the rotor and the distributor produces a first sealing contact between the rotor and the distributor.

3. The radial piston machine according to claim 2, wherein:
the shaft is axially supported by a bearing;
the shaft is coupled to the rotor and is axially movable relative to the rotor; and
a second abutment between the rotor and the bearing produces a second sealing contact between the rotor and the bearing.

4. The radial piston machine according to claim 1, wherein the housing is configured as a one-piece housing that houses at least the distributor and the plurality of brake discs.

5. The radial piston machine according to claim 1, wherein:
the housing includes an inner radial surface in which the shaft is housed;
the inner radial surface comprises a first region and at least one second region, the first region and the at least one second region comprising an entirety of the inner radial surface;
the first region includes a plurality of splines defining an inner root diameter; and
the inner root dimeter is less than diameters of the entirety of the at least one second region.

6. The radial piston machine according to claim 5, wherein the housing is configured as a one-piece housing that houses at least the distributor and the plurality of brake discs.

7. The radial piston machine according to claim 1, wherein a cavity is defined in the housing, the cavity filled with the pressure fluid having the pressure such that the pressure acts on the actuator to hydraulically operate the actuator and on the distributor to produce the associated forces on the distributor.

8. The radial piston machine according to claim 1, wherein the distributor is housed in the housing such that the housing axially surrounds the distributor.

9. The radial piston machine according to claim 1, wherein an outer periphery of the distributor is adjacent to an inner periphery of the housing with a clearance such that the distributor is axially moveable relative to the housing.

* * * * *